UNITED STATES PATENT OFFICE 1,982,681

DIAZOIMINO COMPOUND PRODUCED FROM HETEROCYCLIC IMINES

Eugene A. Markush, Jersey City, N. J., assignor to Pharma Chemical Corporation, New York, N. Y., a corporation of New York No Drawing. Application February 6, 1933, Serial No. 655,470

26 Claims. (Cl. 260—69)

My invention relates to aqueous soluble compounds of the partly and completely hydrogenated heterocyclic imide compounds, containing at least one solubilizing acid group and processes for producing the same.

The compounds of my invention possess germicidal and insecticidal properties, are very stable in their neutral or alkaline condition and are easily split into their original reacting components by the action of acids and hence are valuable for the production of dyes.

The process of producing my new compounds consists in causing one mole of a diazotized amino compound or tetrazotized diamino compound, or one mole of a nitrosamine to react with a partly, or completely hydrogenated heterocyclic imine compound, the compounds thus produced having the probable formula:

$$R-[N=N-N-XZ_n]_n$$

in which R is an aryl residue which is unsubstituted or substituted other than in the amino group; N—X is the radical of a partly or completely hydrogenated heterocyclic imide including the substituted derivatives thereof; Z is a solubilizing acid group such as the carboxyl and sulpho groups, and $n$ is the numeral 1 or more.

In a general way, one mole of a diazotizable or tetrazotizable amino compound is diazotized or tetrazotized in the usual manner. The diazonium or tetrazonium compound is added with sufficient stirring, to a solution of a partly hydrogenated or completely hydrogenated heterocyclic imine compound and an acid binding chemical, as for instance sodium carbonate, potassium carbonate, sodium bicarbonate, potassium bicarbonate or other suitable compound, and the mixture stirred until the compound is formed. If necessary, the solution is then saturated with sodium chloride, allowed to stand and the precipitate removed and dried. I have found that it is sometimes advisable to evaporate the reaction mixture to dryness.

I give the following as examples of the following of my process:—

Example 1

1 mole of 1-amino-2-methoxy-5-chlor-benzene is dissolved in sufficient water and 2.5 moles of hydrochloric acid 20° Bé., chilled with ice and diazotized in the usual manner with 1 mole of sodium nitrite dissolved in 100 parts of water. The diazo solution is slowly added to a solution prepared from 1 mole of proline (alpha-carboxy-pyrrolidine) and excess of sodium carbonate.

The diazo amino compound is separated and dried. It has the probable formula:

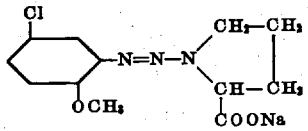

Example 2

1 mole of ortho-amino diphenyl ether is dissolved in 100 parts of water and 2.5 moles of hydrochloric acid 20° Bé. and diazotized in the usual manner with 1 mole sodium nitrite dissolved in water. The clear diazonium solution is added to a solution of sulpho-benzylene-imine and soda ash. After the formation of the diazo amino compound is complete, it is separated and dried. The thus formed compound has the probable formula:—

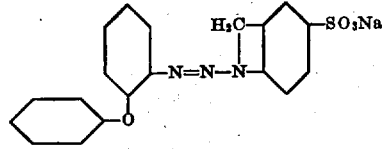

Example 3

One mole of the iso diazonium sodium salt of 4-chlor-2-amino-anisol prepared by heating the diazonium solution with an excess of concentrated sodium hydroxide solution is sludged in cold water and a solution of 1.1 moles of beta-hydroxy-alpha-carboxy-pyrrolidine is added.

Sufficient sodium bicarbonate is added to convert the sodium into sodium carbonate and the reaction mixture stirred for several hours. A sample should not give any color when spotted on paper with R-salt solution.

The reaction product is completely precipitated by the addition of sodium chloride, filtered, pressed and dried.

Because of their stability under ordinary storage conditions and their property of being split up into their component parts by acid treatment, many of them are particularly valuable in the printing and dyeing of vegetable fibers and fabrics.

For these purposes, the products of my invention are intimately mixed with a component having the property of coupling with the nitrosamine, or diazotized amino, or tetrazotized diamino compound, used in the production of the compounds of my invention. One or more of these coupling components may be substituted by members of the groups, such as alkyl, alkoxy, halogen, hydroxyl, carboxylic, nitro and sulfo groups.

The general method of printing upon vegetable fiber or fabric, is to print the mixture of my compound and a suitable coupling component upon the fiber, or fabric, by means of a printing paste, and then subject the thus printed fiber, or fabric, to an acid treatment under conditions which cause the compound to be split, the diazotized amino compound, or tetrazotized diamino compound, thus formed, combining with the coupling component to form a dye.

Printed effects can be produced by padding the fiber, or fabric, with the coupling component, printing with my compounds and then subjecting the thus treated fiber, or fabric, to an acid treatment under conditions which cause the compound to be split, the diazotized amine or tetrazotized diamino compound thus formed combining with the coupling compound.

The general method of producing dyes in substance is to dissolve or suspend, the mixture of by compound and a coupling compound in water, containing an excess of sodium hydroxide, add a small quantity of alcohol, or "Cellosolve", if necessary, add acetic acid in excess, heat if necessary, and separate the produced dye.

I do not limit myself to the above described methods of producing dye prints as they are given simply to indicate means whereby these results can be obtained.

The following are given as examples of amino compounds which may be employed in the following of my invention:—o-chlor-aniline; p-chlor-aniline; 4-chlor-2-amino-anisol; o-anisidine; tolidine; benzidine; dichlor-dianisidine; p-nitro-o-toluidine; o-amino-diphenylether; dianisidine; dichlor-aniline; 5-nitro-2-amino-1-methyl-benzene; 2-amino-4-methoxy-5-benzoyl-amino-1-chlorobenzene; 4-amino-1.3-dimethyl-benzene; 3-amino-4-methoxy-6-benzoylamino-1-methyl-benzene; sulphanilic acid; 6-amino-3-benzoylamino-4-ethoxy-1-methoxybenzene.

I mention the following as among the completely hydrogenated and partially hydrogenated imines, suitable in the following of my invention:—alpha - carboxy - pyrrolidine; alpha - 1 - alpha - 2 - dicarboxy-pyrrolidine; trimethylene-imine-sulfonic acid which has the formula:

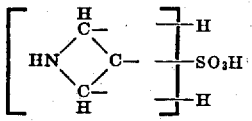

dicarboxy piperidine; disulfo-phenyl-dimethylene-imine which has the formula:

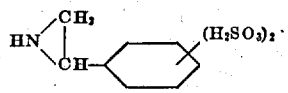

methyl-carboxy-dimethylene-imine which has the formula:

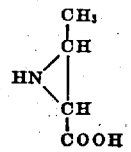

sulfo - benzelene - imine; dicarboxyl - phenyl-dimethylene-imine which has the formula;

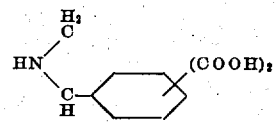

1.2 - dihydro - 2 - phenyl - quinoline-4-carboxylic acid; 1.2-dihydro-2-methyl-quinoline-4-carboxylic acid; 1.2.3.4-tetrahydro-2-methyl-quinoline-4-carboxylic acid; alpha-carboxy-piperidine or hexahydro-picolinic acid; beta-carboxy-piperidine or hexahydro-nicotinic acid, tetrahydro-nicotinic acid.

By "solubilizing acid compounds" I mean an acid group such as the carboxyl and sulfo groups, which will cause the otherwise water insoluble compound to become water soluble.

I do not limit myself to the particular chemicals, quantities, times, temperatures or steps of procedure specifically mentioned, as these are given simply to explain my invention.

What I claim is:—

1. Diazoimino compounds having the following general formula:

wherein R represents the residue of an arylamine, X represents the residue of a heterocyclic imine which is at least partially hydrogenated and which contains at least one water-solubilizing group, the $n$ represents the integer 1 or 2.

2. The product defined in claim 1 wherein the component represented by R is free from water-solubilizing groups and the component represented by X is capable of coupling with a diazotized aromatic amine through the imino group.

3. Alkali metal salts of the products defined in claim 1.

4. Diazoimino compounds having the following general formula:

wherein R represents an aromatic nucleus which is free from water-solubilizing groups, X represents a heterocyclic imine which is at least partially hydrogenated and which contains at least one water-solubilizing group, and $n$ represents the integer 1 or 2, said compound being produced by reacting a member of the group consisting of nitrosamines, diazotized aromatic amines or tetrazotized aromatic diamines with a heterocyclic imine which is at least partially hydrogenated, which contains at least one water-solubilizing group, and which reacts with the aforesaid aromatic compound through the imino group.

5. Alkali metal salts of the products defined in claim 4.

6. Diazoimino compounds having the following general formula:

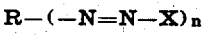

wherein R represents the residue of an arylamine, X represents the residue of a member selected from the group consisting of piperidine and pyrrolidine compounds which contain at least one water-solubilizing group, and $n$ represents the integer 1 or 2.

7. Diazoimino compounds having the following general formula:

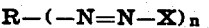

wherein R represents the residue of an arylamine of the benzene series which is free from water-solubilizing groups, X represents the residue of a member selected from the group consisting of piperidine and pyrrolidine compounds which contain at least one water-solubilizing group, and $n$ represents the integer 1 or 2.

8. Diazoimino compounds having the following general formula:

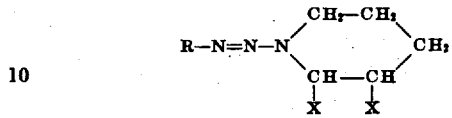

wherein R represents the residue of an arylamine of the benzene series which is free from water-solubilizing groups, one X represents a carboxylic or sulfonic acid group and the other X represents hydrogen.

9. Diazoimino compounds having the following general formula:

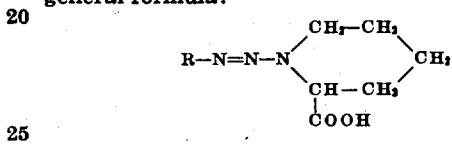

wherein R represents the residue of an arylamine of the benzene series which is free from water-solubilizing groups.

10. Diazoimino compounds having the following general formula:

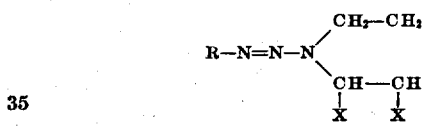

wherein R represents the residue of an arylamine of the benzene series which is free from water-solubilizing groups, one X represents a carboxylic or sulfonic acid group and the other X represents hydrogen.

11. Diazoimino compounds having the following general formula:

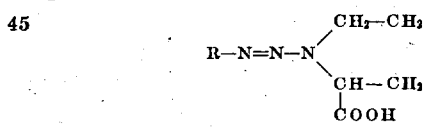

wherein R represents the residue of an arylamine of the benzene series which is free from water-solubilizing groups.

12. A process for producing diazoimino compounds which comprises reacting a diazotized arylamine with a heterocyclic imine which is at least partially hydrogenated and which contains at least one water-solubilizing group.

13. The process defined in claim 12 wherein the arylamine is free from water-solubilizing groups and the heterocyclic imine is capable of reacting with the diazotized aromatic amine through the imino group.

14. A process for producing diazoimino compounds which comprises reacting a member selected from the group consisting of nitrosamines, diazotized aromatic amines and tetrazotized aromatic diamines which are free from water-solubilizing groups, with a heterocyclic imine which is at least partially hydrogenated and which contains at least one water-solubilizing group, said reaction taking place through the imino group.

15. A process for producing diazoimino compounds which comprises reacting a diazotized aromatic amine with a member selected from the group consisting of piperidine and pyrrolidine compounds which contain at least one water-solubilizing group.

16. A process for producing diazoimino compounds which comprises reacting a diazotized aromatic amine of the benzene series which is free from water-solubilizing groups with a member selected from the group consisting of piperidine and pyrrolidine compounds which contain at least one water-solubilizing group.

17. A process for producing diazoimino compounds which comprises reacting a diazotized aromatic amine of the benzene series which is free from water-solubilizing groups with a piperidine compound having the following general formula:

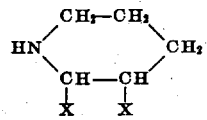

wherein one X represents a carboxylic or sulfonic acid group and the other X represents hydrogen.

18. A process for producing diazoimino compounds which comprises reacting a diazotized arylamine of the benzene series which is free from water-solubilizing groups with piperidine-alpha-carboxylic acid.

19. A process for producing diazoimino compounds which comprises reacting a diazotized arylamine of the benzene series which is free from water-solubilizing groups with a pyrrolidine compound having the following general formula:

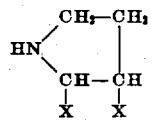

wherein one X represents a carboxylic or sulfonic acid group and the other X represents hydrogen.

20. A process for producing diazoimino compounds which comprises reacting a diazotized arylamine of the benzene series which is free from water-solubilizing groups with pyrrolidine-alpha-carboxylic acid.

21. A process for producing alkali soluble diazoimino compounds which comprises coupling a diazotized aromatic amine containing no solubilizing group with a pyrrolidine compound containing at least one solubilizing group.

22. A diazo-imino compound having the following general formula:

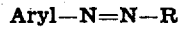

Aryl—N=N—R in which aryl represents an aromatic nucleus not containing a solubilizing group and R represents a pyrrolidine nucleus containing at least one solubilizing group.

23. A process for producing alkali soluble diazo-imino compounds which comprises coupling a diazotized aromatic amine of the benzene series, containing no solubilizing groups, with pyrrolidine-alpha-carboxylic acid.

24. A diazo-imino compound having the following general formula:—

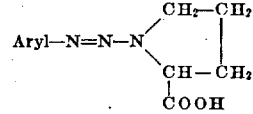

in which aryl represents an aromatic nucleus of the benzene series, containing no solubilizing groups.

25. As a new compound, the water-soluble compound resulting from the combination of one mole of diazotized 1-amino-2-methoxy-5-chlorbenzene with 1 mole of proline (alpha-carboxypyrrolidine), which compound does not dye textile fibers, which splits into its original components by acidifying its aqueous solution, which is highly stable to atmospheric conditions and which is capable of combining upon being split, with coupling components, forming colored compounds.

26. As a new compound, an alkali-metal salt of the compound described in claim 25.

EUGENE A. MARKUSH.

Certificate of Correction

Patent No. 1,982,681.             December 4, 1934.

EUGENE A. MARKUSH

It is hereby certified that errors appear in the printed specification of the above numbered patent requiring correction as follows: Page 2, line 27, for "by" read *my*; and lines 55 to 59, strike out the formula and insert instead—

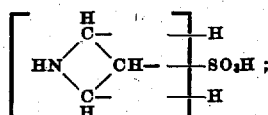

and same page, lines 78 to 83, strike out the formula and insert instead—

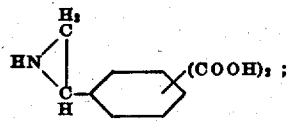

page 3, lines 30 to 35, claim 10, strike out the formula and insert instead—

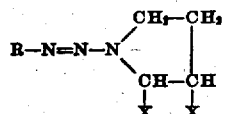

and lines 45 to 49, claim 11, strike out the formula and insert instead—

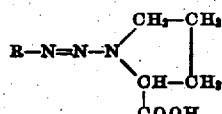

and that the said Letters Patent should be read with these corrections therein that the same may conform to the record of the case in the Patent Office.

Signed and sealed this 26th day of February, A. D. 1935.

[SEAL]                                                     LESLIE FRAZER,
*Acting Commissioner of Patents.*

25. As a new compound, the water-soluble compound resulting from the combination of one mole of diazotized 1-amino-2-methoxy-5-chlorbenzene with 1 mole of proline (alpha-carboxypyrrolidine), which compound does not dye textile fibers, which splits into its original components by acidifying its aqueous solution, which is highly stable to atmospheric conditions and which is capable of combining upon being split, with coupling components, forming colored compounds.

26. As a new compound, an alkali-metal salt of the compound described in claim 25.

EUGENE A. MARKUSH.

Certificate of Correction

Patent No. 1,982,681. December 4, 1934.

EUGENE A. MARKUSH

It is hereby certified that errors appear in the printed specification of the above numbered patent requiring correction as follows: Page 2, line 27, for "by" read *my*; and lines 55 to 59, strike out the formula and insert instead—

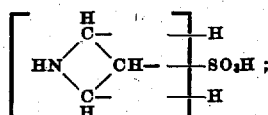

and same page, lines 78 to 83, strike out the formula and insert instead—

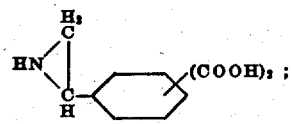

page 3, lines 30 to 35, claim 10, strike out the formula and insert instead—

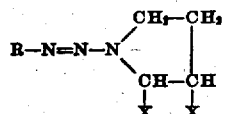

and lines 45 to 49, claim 11, strike out the formula and insert instead—

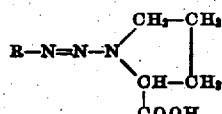

and that the said Letters Patent should be read with these corrections therein that the same may conform to the record of the case in the Patent Office.

Signed and sealed this 26th day of February, A. D. 1935.

[SEAL]

LESLIE FRAZER,
*Acting Commissioner of Patents.*